Patented Sept. 20, 1932

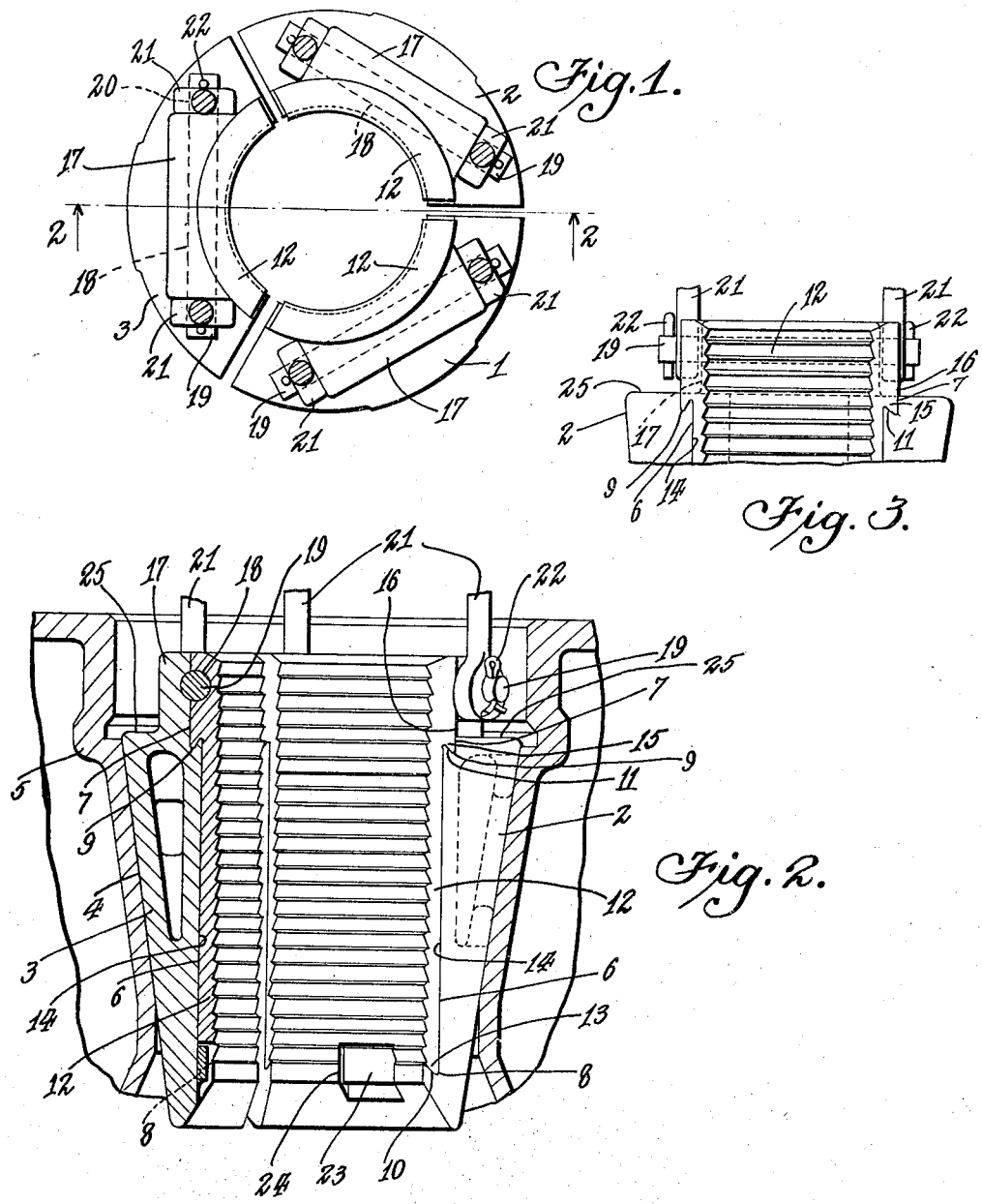

1,878,433

UNITED STATES PATENT OFFICE

FORREST JOSEPH YOUNG, OF TORRANCE, CALIFORNIA, ASSIGNOR TO THE NATIONAL SUPPLY COMPANY OF DELAWARE, OF NEW YORK, N. Y., A CORPORATION OF DELAWARE

SLIP WITH REMOVABLE LINER

Original application filed January 11, 1928, Serial No. 245,876. Divided and this application filed March 11, 1930. Serial No. 434,980.

This invention relates to slips with removable liners, and is more particularly related to slips such, for example, as are adapted for use in rotary machines, slip elevators, spiders, and the like, having removable or renewable liners mounted upon the inner periphery of the segmental slips and providing the gripping surfaces for the slips.

This application is a division of my copending application, Serial No. 245,876 for slip with removable liner, filed January 11, 1928.

Slips with removable liners have heretofore been provided for use in rotary machines, slip elevators, spiders, and the like, in order to provide the slips with replaceable or removable gripping surfaces so as to eliminate the necessity of providing an entirely new slip when the gripping surface has become worn. These slips, however, have had the liners removably mounted therein in such a manner as to either reduce the gripping surface provided on the inner periphery or in such a manner as to make the removal of the liners difficult.

It is, therefore, an object of this invention to provide an improved form of slip having a removable liner including a slip body formed to the shape or form desired and having on its inner periphery stepped, tapered shoulders into which correspondingly stepped portions of the liners fit in order to hold the slips from downward movement relative to the body of the slips.

Another object of this invention is to provide a slip having an insert liner, the gripping surface of which liner is equal to or greater than the gripping surface which would be provided if the inner periphery of the slip were formed to provide a gripping surface.

Another object of this invention is to provide a slip having a renewable liner, means for holding the liner from longitudinal movement downwardly relative to the body of the slip, means at the upper end of the liner and body for preventing longitudinal movement of the liner relative to the body upwardly, and for holding the liner at the upper end from rotative movement relative to the body of the slip, and means at the lower end of the liner and body of the slip for preventing relative rotative movement thereof.

Other objects and advantages of this invention, it is believed, will be apparent from the following detailed description of a preferred embodiment thereof, as illustrated in the accompanying drawing.

In the drawing:

Figure 1 is a top plan view of a plurality of segmental slips embodying this invention.

Figure 2 is a sectional elevational view taken substantially on the line 2—2 of Figure 1, illustrating the slips as mounted in position in a fragment of a tapered body.

Figure 3 is a fragmental front elevational view of a rotary slip embodying this invention.

In the preferred embodiment of this invention, illustrated in the accompanying drawing, 1, 2, and 3 illustrate segmental slips, any desired or preferred number of which may be employed in order to provide a complete gripping cylinder upon the inner periphery of slips. The slips 1, 2 and 3 are all of the same construction and are provided with exterior tapered peripheries, as illustrated at 4, tapered complementary to the inner tapered passage formed through a body 5. The body 5 may be a rotary table, bushing, elevator body or body of a spider or other device embodying a slip such, for example, as are commonly employed in the oil production industry.

The inner surface of the body of the slips is formed to provide two stepped substantially vertically extending walls 6 and 7, which terminate in annular recesses 8 and 9, providing upwardly tapering shoulders 10 and 11, respectively. The slips are provided with liners 12 which are formed tapered at their lower end, as illustrated at 13, complementary to the lower taper 10 of the body of the slip and providing a vertically extending surface 14 adapted to engage the vertically extending wall 6 of the body of the slip. The vertically extending surface of the liner 12 terminates in a shoulder 15 having a taper complementary to the upper taper 9 of the body of the slip and the slip extends upwardly from the annular shoulder 15 along a vertically extending surface 16 which engages the vertical extending surface 7 of the body of the slip. The annular engaging portions of the liner and slips above described prevent movement of the liner 12 downwardly relative to the body of the slip.

Means are provided for holding the liners 12 from vertical upward movement relative to the body of the slips and which means preferably comprise means for securing to the body of the slip bails by means of which the slips may be raised from the body 5, which means are preferably of the following construction:

Formed at the upper end of the slips is an upwardly projecting substantially rectangular portion 17 having a curved inner periphery complementary to the curved outer surface of the liner 12. Formed through the portion 17 of the body of the slip and the upper end of the liner 12 is a bore 18 through which a pin 19 is inserted. The pin 19 passes through the eyes 20 of the bail 21 and is provided with cotter pins 22 at its opposite ends which hold the pin 19 in position. The pin 19 by this means holds the liner 12 from vertical upward movement relative to the body of the slip and also acts to prevent relative rotative movement of the liner 12 relative to the body of the slip. In order to hold the liner 12 at the lower end from rotative movement relative to the body of the slip, a plate 23 is provided which is mounted in a cut out portion formed in the lower end of the body of the slip and secured in position by any suitable or desirable means such, for example, as welding the same in position. The plate 23 fits within a cut out recess 24 formed in the lower end of the liner 12, thereby holding the lower end of the liner 12 from rotative movement relative to the body of the slip.

In order to provide a maximum of gripping surface, the liners 12 are all of a segmental length equal to the segmental length of the inner surface of the slips and also extend vertically upward above the upper surface 25 of the body of the slip. The liners 12 are formed on their inner periphery with any suitable form of irregular or serrated surface to provide gripping means for gripping the plain exterior surface of pipes, casings, drill stems, or the like.

Having fully described my invention, it is to be understood that I do not wish to be limited to the details herein set forth, but my invention is of the full scope of the appended claims.

I claim:

1. A segmental slip including a tapered body, a liner mounted on the inner periphery of said body, a pair of vertically spaced shoulders formed on the inner periphery of said slip, one end of said liner engaging the said lower shoulder, an arcuate shoulder formed on the rear periphery of said liner and adapted to engage the said upper shoulder, and means secured to said body and engaging said liner to hold the same from movement transversely relative to said body.

2. A segmental slip including a tapered body, a liner mounted on the inner periphery of said body, a pair of vertical spaced shoulders formed on the inner periphery of said slip, one end of said liner engaging the said lower shoulder, an arcuate shoulder formed on the rear periphery of said liner and adapted to engage the said upper shoulder, and means at the upper end of the body engaging the liner to hold the liner from movement around the inner periphery of said body.

3. In a segmental slip, the combination of a body having a tapered exterior periphery, a liner mounted on the inner periphery of said body, a pair of spaced upwardly tapered shoulders formed on the inner periphery of said body, an arcuate shoulder formed on the outer periphery of the liner, the arcuate shoulder and the lower end of said liner being tapered to correspond with and engaging the spaced upwardly tapered shoulders of said body to hold said liner from downward displacement relative to said body, and means above the upper of said tapered shoulders for fastening said body and said liner, and holding said liner from movement transversely of said body.

4. In a segmental slip, the combination of a body having a tapered exterior periphery, a liner mounted on the inner periphery of said body, a pair of spaced upwardly tapered shoulders formed on the inner periphery of said body, an arcuate shoulder formed on the outer periphery of the liner, the arcuate shoulder and the lower end of said liner being tapered to correspond with and engaging the spaced upwardly tapered shoulders of said body to hold said liner from downward displacement relative to said body, means above the upper of said tapered shoulders for fastening said body and said liner and holding said liner from movement transversely of said body, and means at the lower end of said body to hold the lower end of said liner from transverse movement relative to said body.

5. In a segmental slip, the combination of a body having a tapered exterior periphery, a liner mounted on the inner periphery of said body, a pair of spaced upwardly tapered shoulders formed on the inner periphery of said body, an arcuate shoulder formed on the outer periphery of the liner, the arcuate shoulder and the lower end of said liner being tapered to correspond with and engaging the spaced upwardly tapered shoulders of said body to hold said liner from downward displacement relative to said body, and means above the upper of said shoulders for fastening said body and liner and holding said liner from upward displacement relative to said body, and from movement transversely of said body.

6. In a segmental slip, the combination of a body having a tapered exterior periphery, a liner mounted on the inner periphery of said body, a pair of spaced upwardly tapered shoulders formed on the inner periphery of said body, an arcuate shoulder formed on the outer periphery of the liner, the arcuate shoulder and lower end of said liner being tapered to correspond with and engaging the spaced upwardly tapered shoulders of said body to hold said liner from downward displacement relative to said body, and a rod passed partly through said body and partly through said liner to the rear of said liner, and holding said liner from upward and transverse movement relative to said body.

7. In a segmental slip, the combination of a body having a tapered exterior periphery, a liner mounted on the inner periphery of said body, a pair of spaced upwardly tapered shoulders formed on the inner periphery of said body, an arcuate shoulder formed on the outer periphery of the liner, the arcuate shoulder and lower end of said liner being tapered to correspond with and engaging the spaced upwardly tapered shoulders of said body to hold said liner from downward displacement relative to said body, a rod passed partly through said body and partly through said liner to the rear of said liner and holding said liner from upward and transverse movement relative to said body, the ends of said rods projecting from said body, and a handle fitted to the ends of said rod.

8. In a device of the class described, the combination of a slip body having a tapered outer surface, a liner, a single member engaging the body and the liner to hold the latter from upward and transverse movement relative to said body, and a handle fitted to the said single member.

Signed at Torrance, California, this 5th day of March 1930.

FORREST JOSEPH YOUNG.